United States Patent [19]

Hoshiba et al.

[11] Patent Number: 5,309,882
[45] Date of Patent: May 10, 1994

[54] OPERATIONAL CONTROL SYSTEM FOR ENGINE

[75] Inventors: Akihiko Hoshiba; Masaki Okazaki; Hiroyuki Tsunekawa, all of Hamamatsu, Japan

[73] Assignee: Sanshin Kogyo Kabushuki Kaisha, Hamamatsu, Japan

[21] Appl. No.: 23,055

[22] Filed: Feb. 25, 1993

[30] Foreign Application Priority Data

Feb. 28, 1992 [JP] Japan .................................. 4-75941

[51] Int. Cl.⁵ .............................................. F02P 5/15
[52] U.S. Cl. .................................. 123/339; 123/421
[58] Field of Search ............... 123/339, 421, 424, 488, 123/491

[56] References Cited

U.S. PATENT DOCUMENTS

| | | | |
|---|---|---|---|
| 4,416,234 | 11/1983 | Ikeura | 123/424 |
| 4,570,596 | 2/1986 | Sato | 123/421 |
| 4,982,712 | 1/1991 | Abe | 123/424 |
| 4,998,521 | 3/1991 | Inoue et al. | 123/424 |
| 5,027,771 | 7/1991 | Daikoku et al. | 123/421 |
| 5,080,067 | 1/1992 | Nakamura | 123/421 |
| 5,197,430 | 3/1993 | Hoshiba et al. | 123/421 |
| 5,222,470 | 6/1993 | Oonuma et al. | 123/339 |

Primary Examiner—Willis R. Wolfe
Attorney, Agent, or Firm—Knobbe, Martens, Olson & Bear

[57] ABSTRACT

A control system for the ignition system of an internal combustion engine for providing faster idle speed when the engine is at a low temperature by advancing the spark timing. A first temperature sensor which senses actual temperature is mounted in the engine ignition control circuit which is, in turn, mounted in proximity to the engine so as to approximate its temperature. A on/off temperature switch is mounted directly in the engine so as to sense when engine temperature is above a predetermined value. The system is operative to provide ignition control by the actual engine temperature unless the second on/off switch is turned on to indicate that the engine temperature has not returned ambient temperature after a running period. If the engine temperature switch is on, normal ignition timing is employed.

18 Claims, 6 Drawing Sheets

OPERATIONAL CONTROL SYSTEM FOR ENGINE

BACKGROUND OF THE INVENTION

This invention relates to an operational control system for an engine and more particularly to an improved temperature responsive arrangement for controlling an engine and particularly its ignition system.

There are many instances in the control of an engine wherein the engine operating temperature is one of the control parameters. For example, it has been proposed to control the idle speed of an engine in response to temperature so that the engine will be set to run faster at low engine temperatures than once the engine warms up. One way in which this speed increase is accomplished, is by advancing the timing of the spark firing when engine temperatures are low.

It has been the practice to position a temperature sensor in a portion of the engine so as to sense its temperature and provide an output signal indicative of actual temperature. Such temperature sensors may be mounted in either the cylinder block or cylinder head of the engine and generally project into the engine cooling jacket, if the engine is liquid cooled, so as to provide an accurate indication of temperature. Although this method of temperature sensing is quite accurate and representative of actual engine temperature, there are some disadvantages with this type of arrangement.

In many engine applications it is very difficult to provide the space required for the temperature sensor, particularly if the temperature sensor is to be mounted in a location where it will provide an accurate indication of temperature. In addition, if the temperature sensor provides a signal for controlling the ignition system, the length of the wires leading from the temperature sensor to the ignition system and the attendant electrical connections can give rise to problems in insuring that an adequate and correct signal is transmitted.

It has, therefore, been proposed to provide a temperature sensor that is mounted directly in the ignition circuit with the ignition circuit being mounted on the engine so as to provide temperature control and the existence of a temperature that is related to the engine temperature at the temperature sensor. This type of arrangement avoids the disadvantages as aforenoted, but itself has certain problems.

Although the mounting of the temperature sensor in the ignition circuit has the advantages aforenoted, the temperature sensor actually provides an accurate indication of engine temperature only when the engine and ignition circuit have both cooled to ambient temperature. If, however, the engine has been running for a period of time and then is shut off, the temperature sensor will cool more rapidly than the engine due to its greater mass and internal heat. Thus, if the engine is restarted after a short delay, the temperature sensor will sense a lower temperature than the actual engine temperature and the control will be inaccurate. When the temperature sensor is used to provide an increase in engine speed and/or spark advance for faster cold warm up, this will mean that the engine, which is at or close to its operating temperature, will be run at too high a rate of speed and at too much spark advance.

It is, therefore, a principal object to this invention to provide an improved arrangement for providing running control for an engine.

It is a further object to this invention to provide an improved temperature sensing device and control system for an internal combustion engine.

It is a yet further object to this invention to provide an improved and simplified arrangement for controlling an engine in response to temperature that will be accurate under all conditions.

SUMMARY OF THE INVENTION

This invention is adapted to be embodied in a device for controlling an operational system of an internal combustion engine in response to engine temperature and comprises first temperature sensing means for sensing actual temperature and providing a signal indicative thereof. Means are provided for mounting the first temperature sensing means in proximity to the engine for sensing the temperature at the proximate location. Second temperature sensing means is provided for sensing only when the temperature exceeds a predetermined value. Means are provided for mounted the second temperature sensing means in the engine for sensing actual engine temperature and providing a signal when the temperature is above the predetermined value. Means are provided for controlling the system of the engine in response to the output of first temperature sensing means unless the second temperature sensing means has provided an output signal indicative that the actual engine temperature is greater than the predetermined value.

Another feature of the invention is adapted to be embodied in a method of engine control having first and second temperature sensing means as described and mounted in the preceding paragraph. In accordance with this method, the engine system is controlled by the output of the first temperature sensing means unless the output of the second temperature sensing means indicates a temperature higher than the predetermined value and in that event, the engine control is under the output of the second temperature sensing means.

DETAILED DESCRIPTION OF THE PREFERRED EMBODIMENTS OF THE INVENTION

Figure 1:
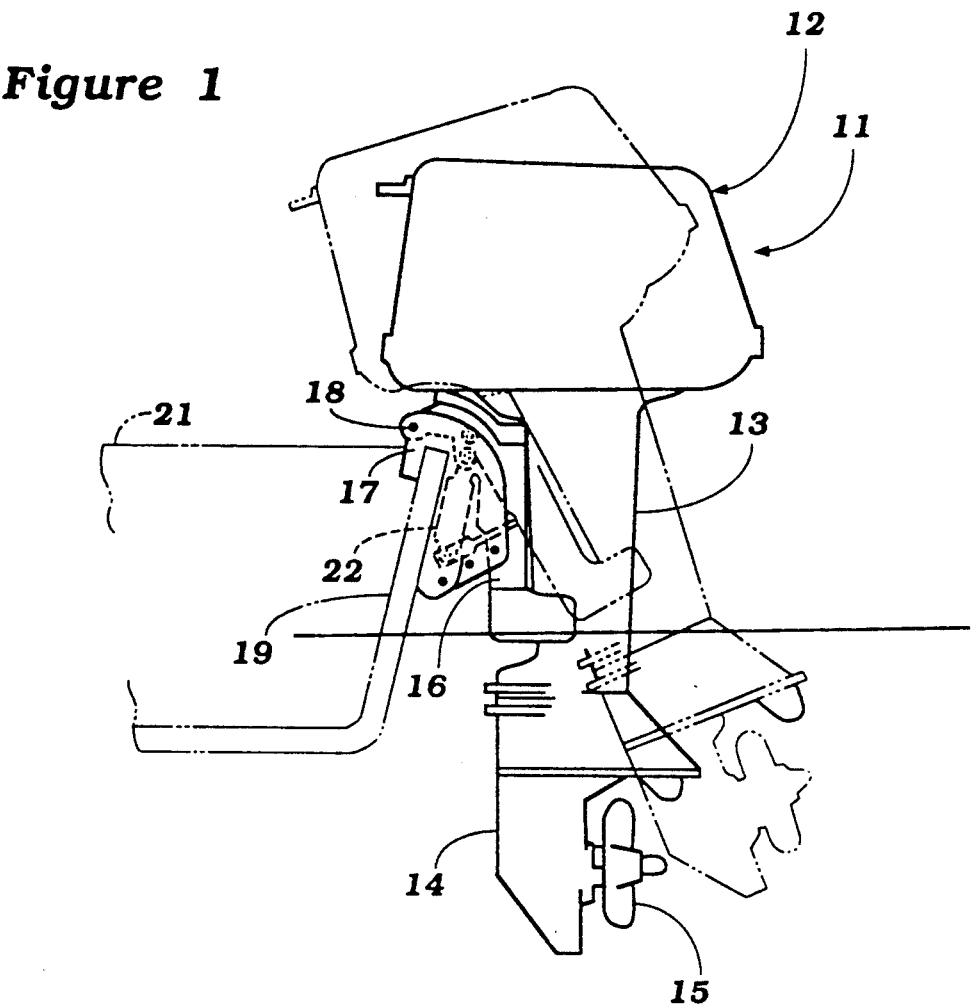
FIG. 1 is a side elevational view of an outboard motor having an engine control system constructed in accordance with an embodiment of the invention as mounted on the transom of an associated watercraft, shown in phantom.

Referring now in detail to the drawings and primarily to FIG. 1, an outboard motor having an internal combustion engine constructed and operated in accordance with an embodiment of the invention is identified generally by the reference numeral 11. Although the invention has particular utility in conjunction with outboard motors or marine propulsion engines, it should be readily apparent to those skilled in the art how the invention can be employed with other applications for internal combustion engines. Thus, in some regards, the depiction of the invention in conjunction with an outboard motor may be considered as exemplary of only one possible application for the invention and, for that reason, detailed description of the outboard motor 11 is not believed to be necessary to understand the construction and operation of the invention.

However, for reference purposes it should be noted that the outboard motor 11 is comprised of power head, indicated generally by the reference numeral 12 and which contains a powering internal combustion engine and surrounding protective cowling, as will be described. The engine of the power head 12 has a vertically extending output shaft, as is typical with outboard motor practice, which drives a drive shaft (not shown) that is journalled within a drive shaft housing 13 which depends from the power head 12. This drive shaft continues into a lower unit 14 positioned at the lower end of the drive shaft housing 13 for driving a propeller 15, conventionally through a known type of forward, neutral, reverse transmission.

A steering shaft (not shown) is affixed to the drive shaft housing 13 and is journalled within a swivel bracket 16 for steering of the outboard motor 11 about a generally vertically extending steering axis. The swivel bracket 16 is, in turn, pivotally connected to a clamping bracket 17 by a horizontally extending tilt pivot pin 18 for tilt and trim movement of the outboard motor 11 about the axis defined by the pivot pin 18. The outboard motor 11 is shown in its normal fully lowered position in solid lines in FIG. 1 and in a trimmed up position in phantom lines in this figure. The clamping bracket 17 is adapted to be affixed to a transom 19 of an associated watercraft, shown in phantom and identified by the reference numeral 21, in a known manner. A hydraulic tilt and trim arrangement 22 is interposed between the swivel bracket 16 and clamping bracket 17 for permitting the outboard motor 11 to pop up when an underwater obstacle is struck and also for hydraulic tilt and trim movement.

As has been previously noted, the construction of the outboard motor 11 may be considered to be conventional and, for that reason, further description of the outboard motor 11 is not believed to be necessary to understand the construction and operation of the invention.

Figure 2:
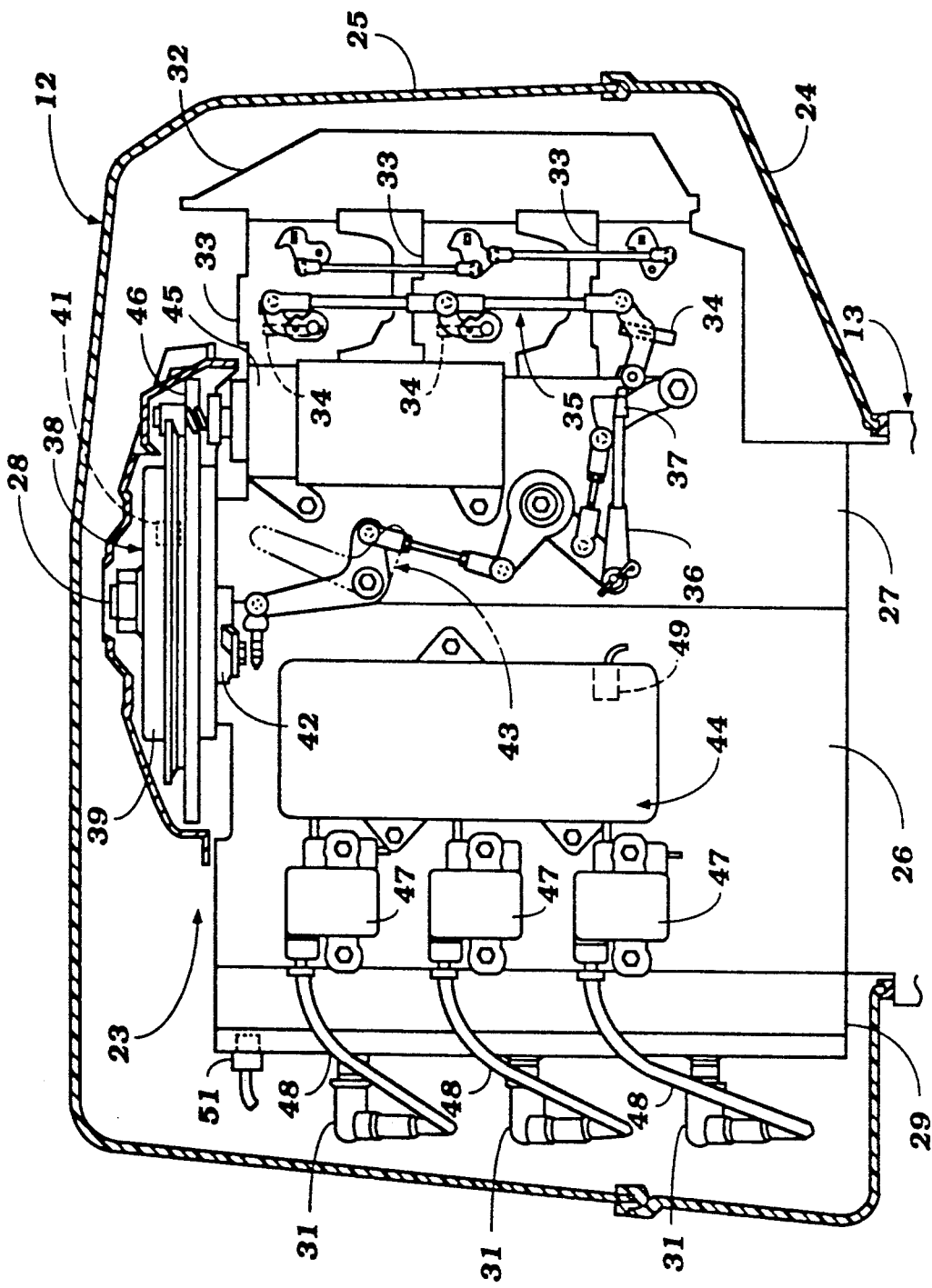
FIG. 2 is an enlarged view of the power head of the outboard motor, with portions broken away.

Referring now to FIG. 2, the power head 12 is shown in more detail and is comprised of an internal combustion engine, indicated generally by the reference numeral 23 and which is constructed and operated in accordance with an embodiment of the invention. The internal combustion engine 23 is surrounded by a protective cowling comprised of a lower tray 24 and a main cowling portion 25 which are secured to each other in any known manner.

In the illustrated embodiment, the internal combustion engine 23 is depicted as being of the three cylinder, inline, two cycle crankcase compression type. It should be readily apparent to those skilled in the art how the invention can be applied to engines of other cylinder numbers and cylinder configurations and engines operated on other than the two stroke principal. In addition, the invention can be utilized with engines which are rotary as opposed to reciprocating engines.

Again, the internal details of the engine 23 are not necessary to understand the construction and operation of the invention. However, certain components of the engine 23 will be described for reference purposes. These components include a cylinder block 26 which has three horizontally extending vertically spaced cylinder bores in which pistons are supported. These pistons drive a crankshaft through connecting rods which crankshaft is journalled in a crankcase assembly formed by the lower portion of the cylinder block 26 and a crankcase member 27 that is affixed to the cylinder block 26 in a known manner. The upper end of crankshaft appears in FIG. 2 and is identified by the reference numeral 28.

A cylinder head assembly 29 is affixed to the cylinder block 26 and forms the completion of the combustion chambers of the engine 23. Spark plugs 31 are mounted in the cylinder head 29 and are fired by means of an ignition circuit, which will be described. As is well known, the spark plugs 31 have their spark gaps extending into the combustion chambers of the engine 23.

The engine 23 is provided with a charge forming system for delivering a fuel/air charge to individually sealed crankcase chambers, as is typical with two cycle engine practice, for compression therein and transferred to the combustion chamber through an appropriate scavenging system. This induction system includes an air inlet device 32 which draws an air charge from within the protective cowling. An atmospheric air inlet is provided in the protective cowling so as to assure a copious supply of air to the engine 23 for its operation. A plurality of carburetors 33, normally one for each cylinder, receive the air charge from the air intake device 32 and form a fuel/air mixture which is delivered to the crankcase chambers through an intake manifold (not shown).

The carburetors 33 have throttle valves 34 which are actuated by a throttle linkage assembly 35 which is, in turn, operated by a throttle control 36 having a portion 37 that is adapted to be positioned to a remote throttle control mechanism. The linkage 35 will insure that the throttle valves 34 are all opened and closed in unison.

As has been noted, the engine 23 is provided with an ignition system for firing the spark plugs 31. This ignition system includes a magneto flywheel assembly, indicated generally by the reference numeral 38 which includes a flywheel 39 that is affixed to the crankshaft 28 for rotation with it and which carries one or more permanent magnets that cooperate with a pulser coil 41 and charging coils (not shown) for the ignition system. The pulser coil 41 is mounted on a mounting plate 42 that is journalled for rotation relative to the crankshaft 28 and which is angularly positioned by a spark advance lever system 43 that is coupled to the throttle control 36 so as to provide rotation of the pulser coil 41 relative to the crankshaft 28 in response to opening of the throttle valve for gradually increasing the spark advance up to a point of maximum advance. This type of construction is well known in the art.

Figure 5:
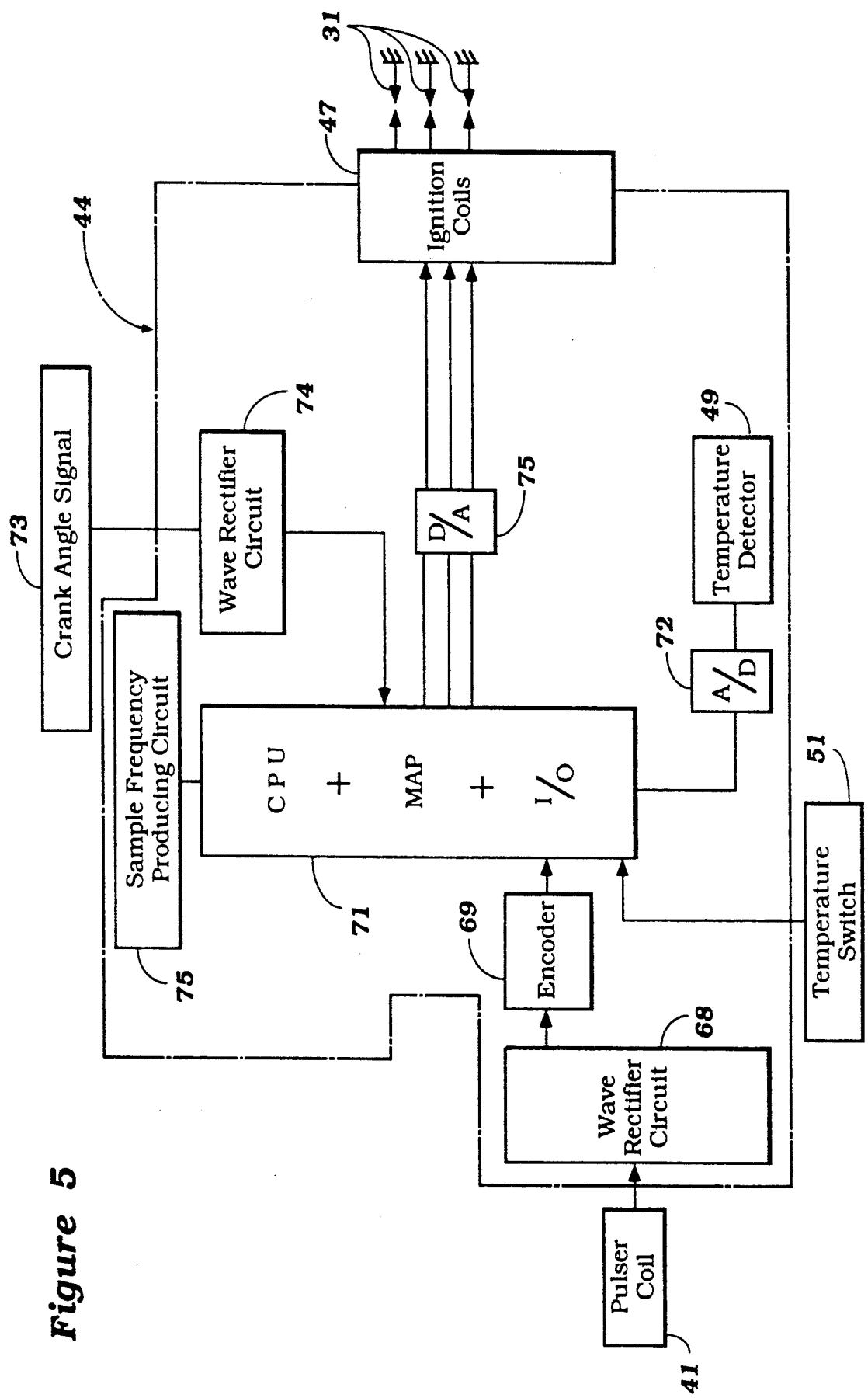
FIG. 5 is a schematic view showing the components of the engine ignition control.

The pulser coil 41 and charging coil supply electrical signals and power to an ignition control circuit, indicated generally by the reference numeral 44 which is encapsulated in a box and which will be described in more detail by reference to FIG. 5.

An electric starting motor 45 is mounted on one side of the crankcase member 27 and carries a pinion gear that is adapted to be enmeshed with a ring gear 46 carried by the flywheel 39 for electric starting of the engine.

Before referring to the remaining figures, the ignition control circuit 44 outputs output voltages to individual spark coils 47 which are mounted on the side of the cylinder block 26 and which supply high voltage signals to the spark plugs 31 for their firing through appropriate conductors 48.

In accordance with the invention, the ignition circuit control 44 is provided with two temperature sensing devices for control of the spark advance in response to temperature. The first of these sensing devices is mounted within the spark control 44 and is indicated by the reference numeral 49 which sensor 49 provides an output signal indicative of actual temperature. That is, the output signal of the sensor 49 provides a signal that is indicative of actual temperature. The sensor 49 may be mounted on a circuit board of the spark control 44 and since the spark control 44 is mounted on the side of the cylinder block 26, under normal steady state conditions, the temperature sensed by the temperature sensor 49 will be indicative of actual engine temperature.

Figure 4:
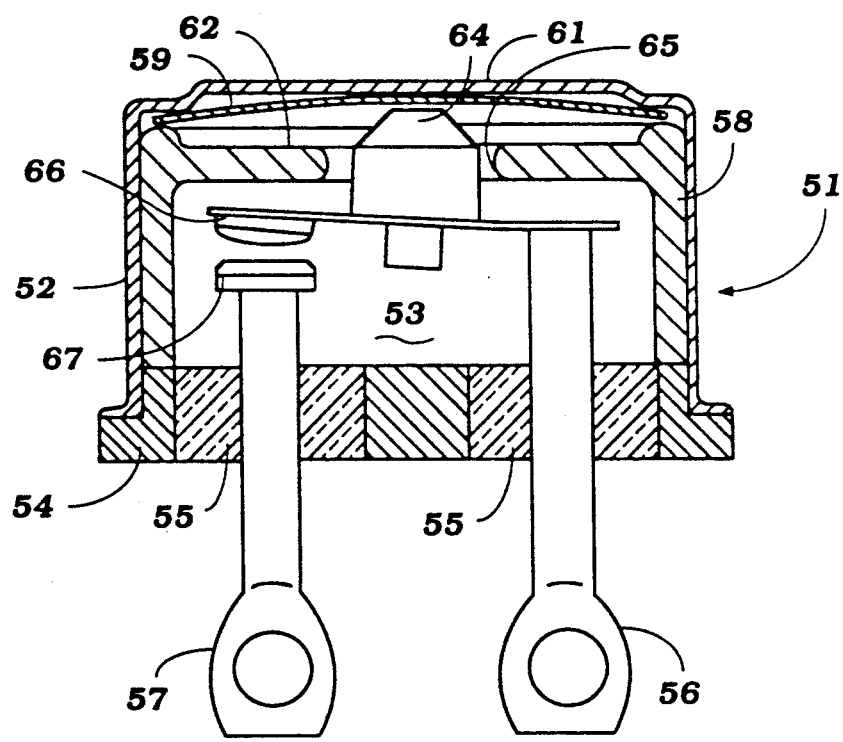
FIG. 4 is an enlarged cross-sectional view of the engine mounted temperature sensor.

A further temperature sensor, indicated generally by the reference numeral 51 and shown in most detail in FIG. 4, is mounted in the cylinder head assembly 29 and extends into its cooling jacket. In this regard, it should be noted that the engine 23 is, as is typical with outboard motor practice, water cooled and has cylinder block and cylinder head cooling jackets through which water drawn from the body of water in which the watercraft 21 is operating is circulated. This water is then dumped back into the body of water in any manner known in this art.

Referring now to FIG. 4, the construction and operation of the second temperature sensor 51 will be described. This temperature sensor 51 includes a main housing piece 52 which is generally of cup-shape and which has its internal cavity 53 closed by a closure plug 54. A pair of insulators 55 are mounted in the closure plug 54 and pass first and second electrical terminals 56 and 57.

An insert piece 58 is received within the cavity 53 and captures a bimetallic Bellville type spring 59 between an endface 61 of the main housing piece 52 and a facing surface 62 of the insert 58. The endface 61 of the housing 52 will be disposed so that it will be exposed to the cooling water in the cooling jacket of the engine 23, as aforedescribed.

A leaf type spring 63 is formed integrally with one end of the terminal 56 and carries a projection 64 that extends through an opening 65 in the insert endface 62. A contact 66 is affixed to the end of the leaf type spring 63 and is adapted to cooperate with a contact 67 formed on the inner end of terminal 57.

FIG. 4 shows the device when the temperature of the engine and the bimetallic spring 59 is such that the bimetallic spring 59 will assume a convex shape. Under this condition, the contacts 66 and 67 will be out of engagement and no circuit will be closed between the terminals 56 and 57.

As is well known with the type of bimetallic Bellville spring 59, once the temperature of this spring reaches a predetermined temperature, which is chosen in a manner to be described, the spring 59 will snap from its convex to a concave condition. When this occurs, the button 64 will be engaged and the contact 66 will be brought into engagement with the contact 67 so as to complete the circuit between the terminals 56 and 57. As the temperature of the engine decreases below the predetermined temperature, the spring 59 will snap back to the position shown in FIG. 4 and the contacts 66 and 67 will be out of contact and the circuit involving the terminals 56 and 57 will be opened. Hence, the temperature sensor 51 in only an on/off type of sensor and hence has a relatively simple construction and can be conveniently mounted in the engine 23 at any desired appropriate location. Also, since the circuit containing the terminals 56 and 57 need only provide an on or off signal, there is no problem with deterioration of the signal in the operation of the system.

Figure 3:
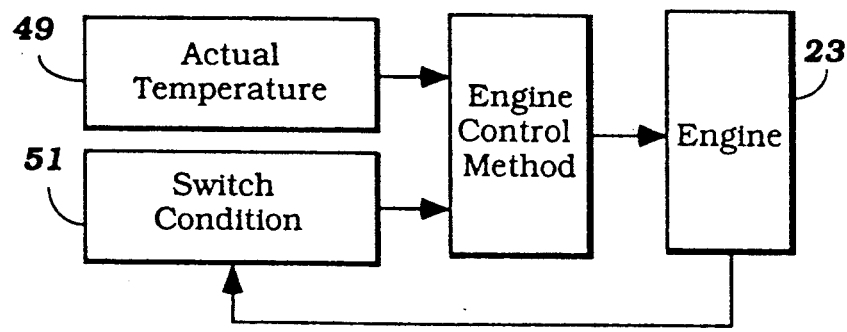
FIG. 3 is a partially schematic view showing the control routine in accordance with an embodiment of the invention.

Before dealing directly with the description of the control system for the engine ignition system in response to temperature by reference to FIG. 5, the basic control routine will be discussed by reference to FIG. 3. As shown in FIG. 3, the engine 23 provides a direct operation of the temperature sensor 51, as aforenoted, so that the temperature sensor 51 will close when the temperature is over the predetermined temperature and be open when the temperature is under the predetermined temperature. The pre-determine temperature chosen is a temperature close to but slightly less than the normal operating temperature of the engine. This condition of the temperature sensor 51 is inputted to the engine control method, which will be described. In addition, the actual temperature sensed by the temperature sensor 49 is also outputted to the engine control method.

The method of operation is that if the temperature sensor 51 is opened, control will be under the operation of the actual temperature control from the temperature sensor 49. Thus, when the engine is started from a long period at ambient temperature, the temperature sensor 49 will closely approximate the actual temperature of the engine. However, if the engine has been run for some time and the predetermined temperature has been exceeded and the engine is then shut off and re-started, as long as the temperature sensor 51 indicates the engine is still at an elevated temperature, control under the temperature sensed by the sensor 49 will not be applied since it is assumed that the engine has not cooled as much as the temperature sensor 49.

The system will now be described by particular reference to FIG. 5 wherein the various components are shown in block form. In this figure, it will be seen that the pulser coil 41 outputs its signals to the spark control circuit 44 and specifically to a wave rectifying circuit 68 thereof which, in turn, outputs its signal to an encoder 69 that transmits the encoded signal to a CPU 71 which also includes a map of pre-programmed engine conditions and the ignition output control and ignition circuit. The temperature sensor 51 also inputs its signal to the CPU 71.

The internal temperature sensor 49 within the spark control 44 outputs its signal to an analog to digital converter 72 which outputs a digital signal indicative of actual temperature to the CPU 71.

The CPU 71 also receives a actual crank angle signal from a crank angle sensor 73 that is mounted on the engine 23 in an appropriate position so as to provide an accurate indication of crank angle position. This signal is transmitted to a wave rectifier circuit 74 which outputs the signal to the CPU 71 that will provide not only crank angle but engine speed signals. The CPU 71 further receives a signal from a sample frequency producing circuit 75.

The CPU 71 then outputs a digital signal, in a manner determined as will be described, to a digital to analog convertor 72 which then outputs a signal to the spark coils 47 for firing the spark plugs 31 in a well known manner. Basically, the ignition circuit can be of the capacitor discharge type that is switched by an SCR or the like as the desired time to provide firing.

Figure 6:
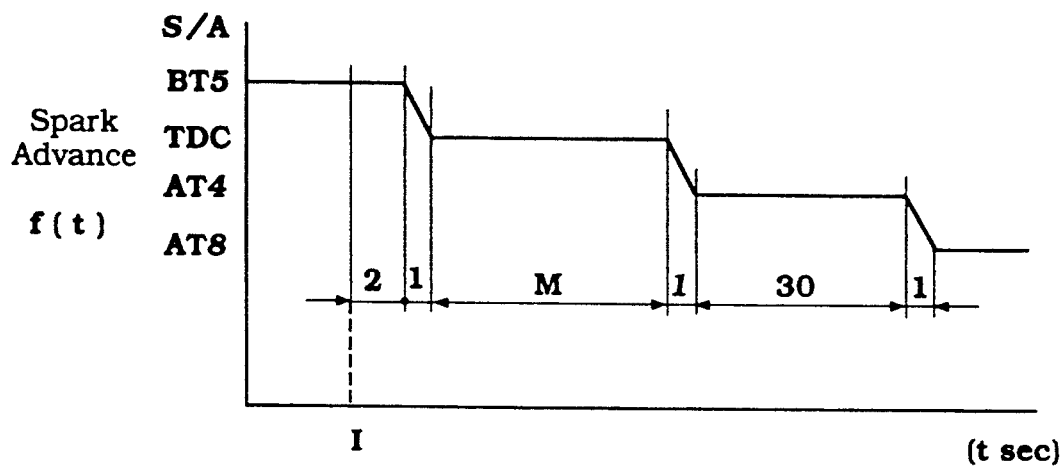
FIG. 6 is a timing diagram showing spark timing in response to elapsed time under cold start up conditions and when operating in accordance with a method of the invention.

Before proceeding to a description of the control routine by reference to FIG. 8, part of the theory and function of the operation will be described by reference to FIGS. 6 and 7. Considering first FIG. 6, this shows a drawing of spark advance relative to time when the engine 23 is started after being standing for a long time so that the ambient temperature of the engine and the ambient temperature of the temperature sensor 49 will be the same and lower than the temperature at which the temperature responsive switch 51 opens (h). When the engine is first started at the point I, the spark advance will be held at a timing that is advanced from the normal spark timing at idle when the engine is at its operating position. In the illustrated embodiment, an advance of 5° before top dead center is initially set when the temperature of the engine is low. This spark advance is held for a certain time at which the engine temperature will gradually begin to increase, for example 2 seconds. Then, the spark advance is retarded over a time period, such as 1 second, to a retarded advancement from that initially set but still one which is advanced to normal idle timing, such as a timing at approximately top dead center. This spark advance is then held for a time M and then the spark advance is again retarded in a fixed increment over a time period of approximately 1 second to a timing at approximately 4° after top dead center, which is still advanced relative to the normal idle speed. It is shown that this timing is held for approximately 30 seconds and then the advance is again retarded over a time period of approximately 1 second. The number of steps and the timing of steps can be varied but generally it is related to the temperature of the temperature sensor 49. However, it is not desirable to continue to vary the spark timing in small increments in respect to small increments of temperature change but rather in large steps as shown in FIG. 6 although this may be done if desired.

Figure 7:
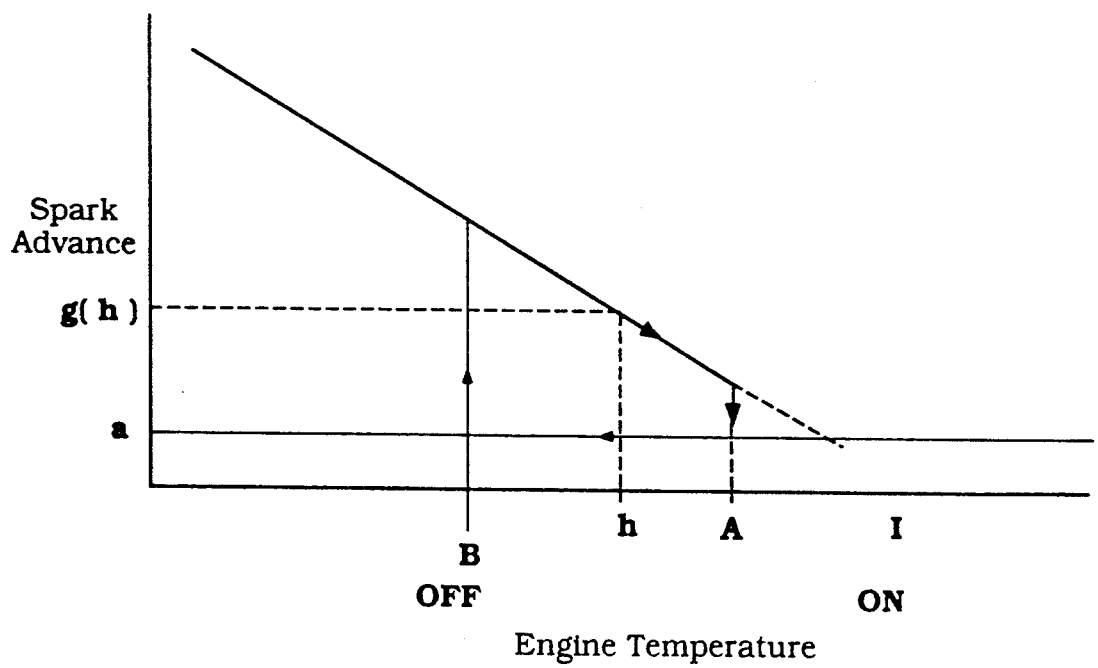
FIG. 7 is a timing diagram showing the spark advance relative to engine temperature under conditions when the engine has been operated at its normal operating temperature, is shut off, cools down and re-starts.
Figure 8:
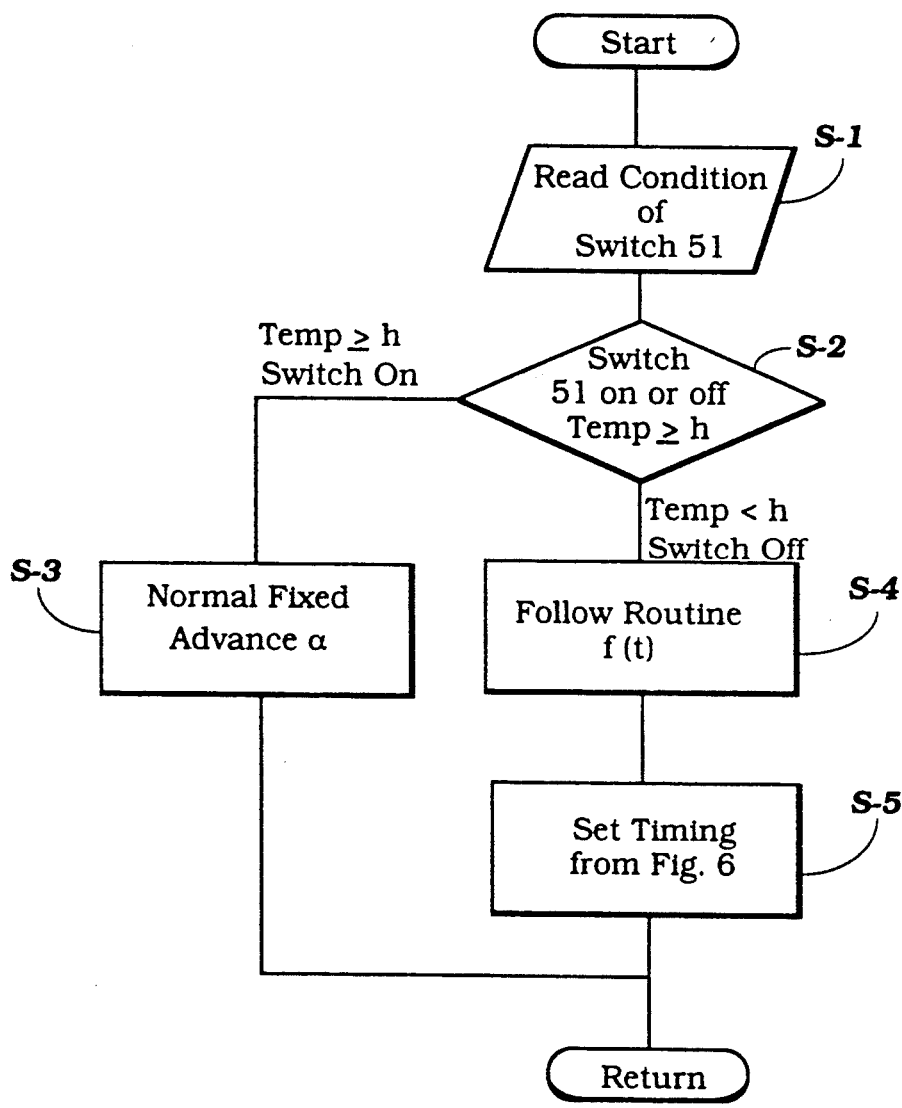
FIG. 8 is a block diagram showing a control routine.

FIG. 7 is another graphical view that shows how the system operates once the engine is up to temperature and then is shut off. As may be seen in this figure, the spark advance is gradually retarded at idle as the engine temperature increases even as the engine temperature passes beyond the predetermined temperature at which the temperature sensor 51 switches on (h). This advance will continue on until the engine reaches normal operating temperature as indicated by the line a which designates the normal fixed spark advance for the engine at operating temperature.

If, however, the engine is switched off at a point when its temperature is elevated, such a the point A, then of course the engine temperature will gradually decrease. As long as the engine is switched back on before the temperature has decreased below temperature h at which the temperature sensor 51 will again open, the restarting of the engine will coincide with maintenance of the spark advance at the fixed advance a. If, however, the engine is switched back on at a point where the temperature is lower than the temperature h (point B) then the program will return to the advanced spark advance under the control of the temperature sensor 49. The way in which this is done will now be described by particular reference to FIG. 8 which shows the control routine for starting under any condition.

When the program starts (FIG. 8) it moves the step S-1 to read the condition of the sensor 51. The program then moves to the step S-2 to see if the temperature of the engine cooling jacket is above the temperature h (sensor 51 on). If the temperature is at or above the temperature h, the program moves to the step S-3 so as to set the ignition timing at the normal fixed advanced a for the normal engine temperature. Thus, if the engine has been operating for some time and still is at a temperature higher than the temperature h and the engine is shut off for a long enough time for the temperature sensor 49 to fall below a temperature equal to the temperature h and re-starting is attempted, the fixed advance for normal temperature will be followed and the engine will not be speeded up needlessly.

If, however at the step S-2 it is determined that the temperature of the sensor 51 is below the temperature h (sensor 51 is off), the program then moves to the step S-4 to follow the control routine depended upon the temperature sensed by the temperature sensor 49. This will occur when the engine has been off long enough that the ambient temperature of the engine and the temperature of the sensor 49 will be closer to each other. The program then moves to the step S-5 so as to set the actual spark advance, for example in accordance with a routine as shown in FIG. 6, and the program will repeat.

From the foregoing description, it should be readily apparent that the described control routine and structure is such that the engine control will be responsive to the actual temperature of the engine without necessitating a temperature sensor in the engine that senses the actual temperature. Said another way, because of the use of the temperature responsive switch in the engine, it is possible to use a temperature sensor in the spark control that provides more accurate temperature indication but which will not provide the control unless it is insured that its temperature is such that it will closely match that of the engine. Although the invention is described in conjunction with a spark ignition control, it is to be understood that it can be used with other types of engine controls, particularly those for providing faster idle speed when the engine temperature is low. Of course, the foregoing description is that of preferred embodiments of the invention and various changes and modification may be made without departing from the spirit and scope of the invention, as defined by the appended claims.

We claim:

1. A device for controlling a system of an internal combustion engine in response to temperature comprising first temperature sensing means for sensing actual temperature and providing a signal indicative thereof, means for mounting said first temperature sensing means in proximity to said engine for sensing the temperature at said proximate location, second temperature sensing means for sensing only when the temperature exceeds a predetermined value, means for mounting said second temperature sensing means in said engine for sensing actual engine temperature and providing a signal only when actual engine temperature exceeds a predetermined temperature, and means for controlling the engine system in response to the output of said first temperature sensing means unless said second temperature sensing means outputs a signal.

2. A device for controlling a system of an internal combustion engine in response to temperature as set forth in claim 1 wherein the engine system is an ignition system and the temperature sensing means changes the idle speed of the engine.

3. A device for controlling a system of an internal combustion engine in response to temperature as set forth in claim 2 wherein the engine idle speed is changed by advancing the spark timing.

4. A device for controlling a system of an internal combustion engine in response to temperature as set forth in claim 2 wherein the first temperature sensing means is positioned within the ignition control circuit of the engine.

5. A device for controlling a system of an internal combustion engine in response to temperature as set forth in claim 4 wherein the second temperature sensing means is positioned in a cooling jacket of the engine.

6. A device for controlling a system of an internal combustion engine in response to temperature as set forth in claim 5 wherein the second temperature sensing means comprises an on/off switch.

7. A device for controlling a system of an internal combustion engine in response to temperature as set forth in claim 2 wherein the second temperature sensing means is positioned in a cooling jacket of the engine.

8. A device for controlling a system of an internal combustion engine in response to temperature as set forth in claim 7 wherein the second temperature sensing means comprises an on/off switch.

9. A device for controlling a system of an internal combustion engine in response to temperature as set forth in claim 8 wherein the first temperature sensing means is positioned in the ignition circuit which ignition circuit is mounted on the engine.

10. A method of controlling a system of an internal combustion engine in response to temperature comprising first temperature sensing means for sensing actual temperature and providing a signal indicative thereof, mounted in proximity to said engine for sensing the temperature at said proximate location, second temperature sensing means for sensing only when the temperature exceeds a predetermined value, mounted in said engine for sensing actual engine temperature and providing a signal only when actual engine temperature exceeds a predetermined temperature, said method comprising controlling the engine system in response to the output of said first temperature sensing means unless said second temperature sensing means outputs a signal.

11. A method of controlling a system of an internal combustion engine in response to temperature as set forth in claim 10 wherein the engine system is an ignition system and the idle speed of the engine is changed.

12. A method of controlling a system of an internal combustion engine in response to temperature as set forth in claim 11 wherein the engine idle speed is changed by advancing the spark timing.

13. A method of controlling a system of an internal combustion engine in response to temperature as set forth in claim 11 wherein the first temperature sensing means is positioned within the ignition control circuit of the engine.

14. A method of controlling a system of an internal combustion engine in response to temperature as set forth in claim 13 wherein the second temperature sensing means is positioned in a cooling jacket of the engine.

15. A method of controlling a system of an internal combustion engine in response to temperature as set forth in claim 14 wherein the second temperature sensing means comprises an on/off switch.

16. A method of controlling a system of an internal combustion engine in response to temperature as set forth in claim 11 wherein the second temperature sensing means is positioned in a cooling jacket of the engine.

17. A method of controlling a system of an internal combustion engine in response to temperature as set forth in claim 16 wherein the second temperature sensing means comprises an on/off switch.

18. A method of controlling a system of an internal combustion engine in response to temperature as set forth in claim 17 wherein the first temperature sensing means is positioned in the ignition circuit which ignition circuit is mounted on the engine.

* * * * *